UNITED STATES PATENT OFFICE.

EDWARD A. UEHLING, OF BIRMINGHAM, ALABAMA.

PROCESS OF TREATING BLACK-BAND ORES.

SPECIFICATION forming part of Letters Patent No. 513,744, dated January 30, 1894.

Application filed June 19, 1893. Serial No. 478,035. (No specimens.)

*To all whom it may concern:*

Be it known that I, EDWARD A. UEHLING, a citizen of the United States, and a resident of the city of Birmingham, in the county of Jefferson and State of Alabama, have invented a certain new and useful Improvement in Processes of Treating Black-Band Ores, of which the following is a specification.

My invention relates to the treatment of certain ores known as black band to separate the ore and save the coke as fuel. These ores contain about twenty five or thirty percentum of carbonaceous, bituminous and volatile combustible matter, similar to coal gas, which gives them the properties of soft coal and renders them unfit to be smelted in the raw state except in very small proportions. They also contain from eighteen to twenty five per centum of fixed carbon, and also from thirty five to forty five percentum of incombustible residue, which latter contains from fifty-five to sixty five per centum of metallic iron. The reason why these ores are rendered unfit for use in the blast furnace for profitable treatment is, that they become pasty or semi-fluid at a low temperature, and therefore give trouble in the furnace, and this quality of the ore must be changed before it can be successfully and profitably used. The ordinary way in which these ores are now treated is to stack them in heaps, or in specially built ovens or kilns, and roast them, by which process not only the volatile combustibles are driven off, but the solid or fixed carbonaceous matter, which is valuable as fuel, is consumed, and the iron which remains is completely saturated with oxygen and forms a clinkered and ashy residue containing from fifty-five to sixty five per centum of iron, principally of magnetic oxide. This process of roasting, though very simple, is very wasteful, as the raw ore contains probably from fifteen to twenty times the amount of fuel necessary to do the work, that is, roast the carbonate of iron it contains. The cost of this process is also enhanced in the treatment of the iron obtained by the roasting process in a blast furnace, to drive off the oxygen with which it becomes saturated.

In experiments made in the ordinary beehive coke oven, I have found that the process of coking not only corrects the objectionable property of the ore to become pasty at a comparatively low temperature, but all the fixed carbon, except what is consumed in reducing the iron to the metallic state, is retained. In this I not only save from forty to fifty per centum of the fuel contained in the raw ore, but in addition produce the iron in a metallic state. I utilize the volatile combustible matter for fuel in treating the ore and save all the solid carbon which latter reduces the oxide of iron in the ore to the metallic state, leaving a coke interlaced with metallic iron. This mixture of coke and iron can be crushed and the metallic iron extracted, preferably by magnetic separation. The metallic iron thus separated will resemble malleable iron, and can be utilized in proper proportions with suitable grades of pig-iron in the cupola, puddling furnace, or the open hearth steel furnace.

My process therefore consists in coking the ore instead of burning it, and after coking, then separating the resulting coke and iron, by first crushing and then separating, preferably by means of magnetic separation, leaving the iron in condition to be used directly in the puddling or steel furnace, and leaving the coke to be employed as fuel in gas producers, &c.

The obtaining the iron in a metallic state and the saving of the coke are the important advantages of my process. My process for obtaining these results may be carried into effect in an ordinary bee-hive coke oven, or in a retort oven, but preferably in a specially built oven. As the iron so obtained is neither chemically nor physically fit for use it must be refined. If the metal is to be refined in a puddling or steel furnace, the carbon (coke) must be separated, for which purpose magnetism would be best adapted.

I claim as my improvement—

The process herein described of treating iron ores rich in carbonaceous matter, the same consisting in coking the said ores to drive off the volatile and gaseous carbonaceous components thereof, and reducing the iron to a metallic state, and afterward separating the interlaced iron from the residual carbon or coke, leaving the latter in condition for fuel, as specified.

In testimony whereof I have hereunto signed this specification in the presence of witnesses.

EDWARD A. UEHLING.

Witnesses:
  R. L. STONE,
  S. BOYER.